(12) United States Patent
Ju

(10) Patent No.: US 8,972,682 B2
(45) Date of Patent: Mar. 3, 2015

(54) LOCK-FREE OBJECT RECYCLING

(71) Applicant: Apple Inc., Cupertino, CA (US)

(72) Inventor: Wei-De Ju, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/286,948

(22) Filed: May 23, 2014

(65) Prior Publication Data

US 2014/0258656 A1    Sep. 11, 2014

Related U.S. Application Data

(63) Continuation of application No. 13/437,437, filed on Apr. 2, 2012, now Pat. No. 8,738,878.

(51) Int. Cl.
*G06F 12/12* (2006.01)
*G06F 9/52* (2006.01)
*G06F 12/02* (2006.01)

(52) U.S. Cl.
CPC .............. *G06F 12/121* (2013.01); *G06F 9/526* (2013.01); *G06F 12/0253* (2013.01)
USPC ........................................................ 711/165

(58) Field of Classification Search
CPC .... G06F 12/0253; G06F 12/121; G06F 9/526
See application file for complete search history.

(56) References Cited

U.S. PATENT DOCUMENTS

| 5,465,363 | A | 11/1995 | Orton et al. |
| 6,138,127 | A | 10/2000 | Pasch |
| 6,182,107 | B1 | 1/2001 | Atsatt |
| 6,327,606 | B1 * | 12/2001 | Chidambaran ............... 718/104 |
| 8,738,878 | B2 * | 5/2014 | Ju ................................. 711/165 |
| 2003/0182462 | A1 | 9/2003 | Moir et al. |
| 2005/0114844 | A1 | 5/2005 | Betancourt et al. |
| 2009/0300766 | A1 | 12/2009 | Toub et al. |
| 2011/0078687 | A1 | 3/2011 | Somogyi |
| 2011/0083124 | A1 | 4/2011 | Moskal et al. |

* cited by examiner

*Primary Examiner* — Hiep Nguyen
(74) *Attorney, Agent, or Firm* — Fish & Richardson P.C.

(57) ABSTRACT

Methods, program products, and systems for lock-free object recycling are described. In some implementations, a system can provide a type-neutral wrapper for a first data object. Upon receiving an indicator that the first data object is no longer used, the system can store the first data object and the type-neutral wrapper in a lock-free data structure. Upon receiving a request to create a second data object, the system can fetch the type-neutral wrapper and the first data object from the lock-free data structure without using a lock. The system can then return the first data object as a response to the request.

27 Claims, 7 Drawing Sheets

LOCK-FREE OBJECT RECYCLING

TECHNICAL FIELD

This disclosure relates generally to computer memory management.

BACKGROUND

During execution of a program, an object can be created or destroyed in computer memory. The object can include members that have complex data structures. The members often need to be initialized during creation of the object, and to be cleaned up during destruction of the object. The initialization and clean-up may include, for example, operations of allocating or freeing memory. When the members of the object include complex data structures, the creation or destruction of the object can be expensive in terms of the number of operations to be performed and amount of memory to be allocated and de-allocated. To reduce the expense, object-recycling techniques can be used. When a procedure requests destruction of an object, the object can be placed into an object pool, rather than destroyed. When a procedure requests a new object, the object in the object pool, rather than a new object, can be returned to the procedure. A locking mechanism can be used to manage the object pool to avoid potential conflicts.

SUMMARY

Methods, program products, and systems for lock-free object recycling are described. In some implementations, a system can provide a type-neutral wrapper for a first data object. Upon receiving an indicator that the first data object is no longer used, the system can store the first data object and the type-neutral wrapper in a lock-free data structure. Upon receiving a request to create a second data object, the system can fetch the type-neutral wrapper and the first data object from the lock-free data structure without using a lock. The system can then return the first data object as a response to the request.

Lock-free object recycling can be implemented to achieve the following advantages. Object recycling can be streamlined and simplified. The conventional requirement of a mutex mechanism can be relaxed or removed. Locking of competing procedures, which can occur in a conventional object pool, and which can cause a procedure to wait and do nothing, can be reduced or avoided. Accordingly, a system's overall performance can be improved, when complex objects are frequently created and destroyed. Lock-free object recycling can be extended to multiple operating systems using operating system-specific adaptors, and can be scalable.

Lock-free object recycling can allow an object to be used in multiple locales. Accordingly, lock-free object recycling can be used in a distributed system, e.g., a distributed database, where a portion of the system is in one locale and another portion of the system is in another locale.

The details of one or more implementations of lock-free object recycling are set forth in the accompanying drawings and the description below. Other features, aspects, and advantages of lock-free object recycling will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
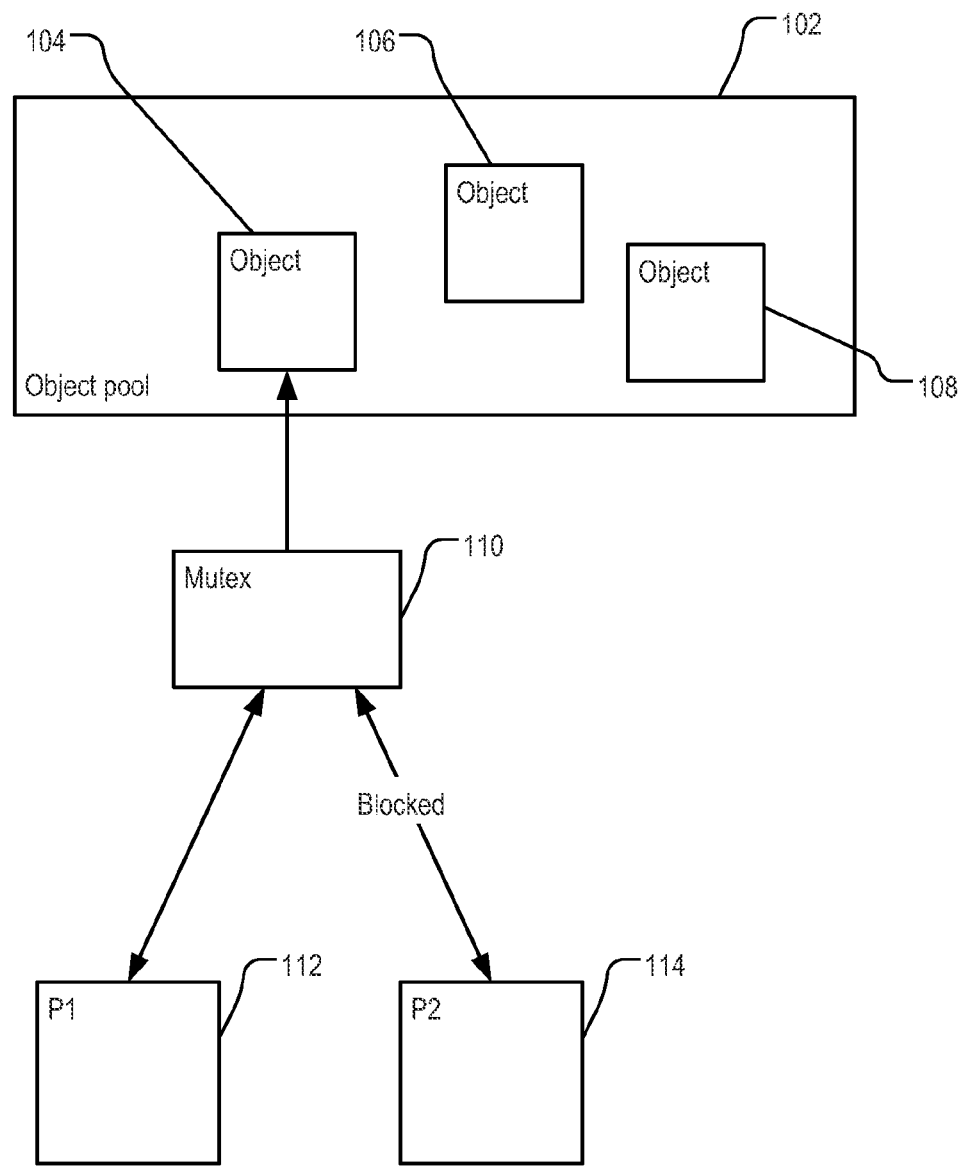
FIG. 1 is a block diagram illustrating exemplary conventional object recycling.

FIG. 1 is a block diagram illustrating exemplary conventional object recycling. A system can use exemplary object pool 102 to recycle objects. Object pool 102 can be a data structure configured to store one or more objects, e.g., objects 104, 106, and 108. The system can place an object in object pool 102 when the system receives a request to destroy the object. Instead of destroying the object, the system can attempt to reuse the object at later time by temporarily placing the object in object pool 102.

The system can use a mutual exclusion (mutex) component 110 to control access to objects 104, 106, 108 in object pool 102. Mutex component 110 can be a software component that is configured to prevent race conditions by locking. If process 112 requests to create a new object, the system can examine mutex component 110 to determine whether an object is available from object pool 102. The system can determine that object 104 is available. Accordingly, the system provides object 104 to process 112. Providing object 104 to process 112 can include various operations that are, by design, simpler than creating a new object for process 112. While the system performs these operations, mutex component 110 can lock object pool 102. When object pool 102 is in a locked state, another process, e.g., process 114, is blocked from accessing objects in object pool 102. If process 114 requests an object from object pool 102, process 114 can wait until mutex component 110 unlocks object pool 102.

Figure 2:
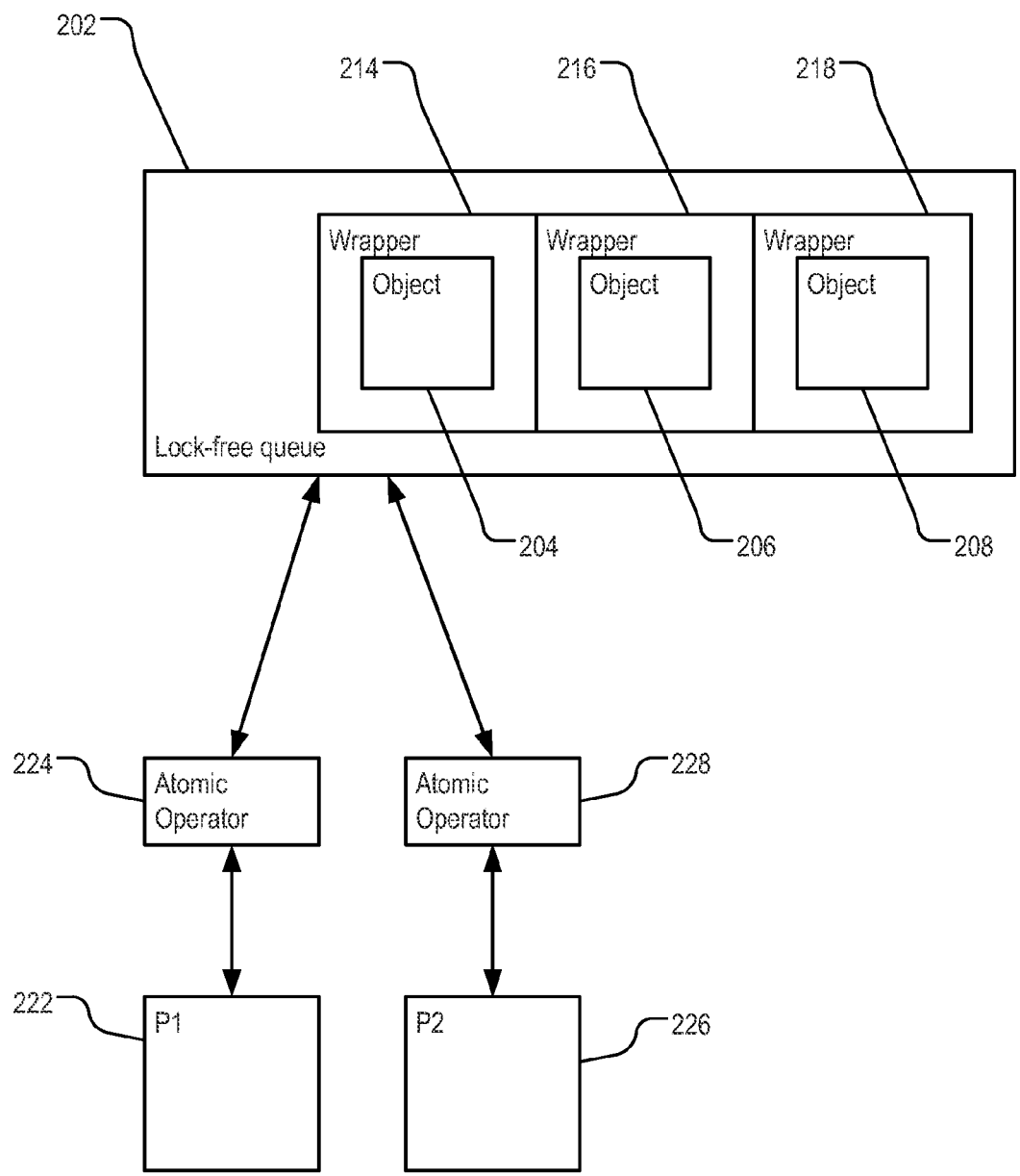
FIG. 2 is a block diagram illustrating exemplary lock-free object recycling.

FIG. 2 is a block diagram illustrating exemplary lock-free object recycling. A system can maintain lock-free queue 202. Lock-free queue 202 can be a hardware-specific data structure or an operating system-specific data structure the operations on which are atomic. Instead of using a mutex component, the system can advantageously use hardware features or operating system features to handle racing conditions, prevent deadlock, live-lock, and priority inversion.

Lock-free queue 202 can function as an object pool. Unlike a conventional object pool, lock-free queue 202 can store one or more objects, where each of the one or more objects is placed in a wrapper that is configured to utilize the hardware features or operating system features. In the example shown, lock-free queue 202 can store objects 204, 206, and 208. Each of objects 204, 206, and 208 can be wrapped in a respective object wrapper 214, 216, and 218, respectively.

When a process or thread requests a new object, the system attempts to provide one of the objects stored in lock-free queue 202 to the process. For example, the system can provide to the process or thread object 204 in object wrapper 214 that is located at a head of lock-free queue 202. If lock-free queue 202 is empty, the system can create a new object and provide the new object to the process or thread. When a process or thread requests disposal of an object, the system can put the object into lock-free queue 202. In various implementations, the system can put the object either at the head of lock-free queue 202 or at the end of lock-free queue 202.

For example, thread 222 can request a new object. Instead of creating the new object, thread 222 can access atomic operator 224 to request an object from lock-free queue 202. Atomic operator 224 can be a hardware-specific or an operating system-specific operator for accessing lock-free queue 202. Thread 222 can access atomic operator 224 through an overloaded new operator of an object or a customized object factory.

Meanwhile, thread 226 can also request a new object. Instead of creating the new object, thread 226 can access atomic operator 228 to request an object from lock-free queue 202. Atomic operator 224 and atomic operator 228 can each take a unit amount of time to execute, and be guaranteed by hardware or the operating system to execute sequentially. Accordingly, even if thread 222 and thread 226 make their respective requests at the same time, deadlock, live-lock, and priority inversion will not occur, despite the absence of a lock at lock-free queue 202.

Each of objects 204, 206, and 208 can have a distinct object type or size. Object wrappers 214, 216, and 218 can be utilized to hide the distinct object types or sizes such that items in lock-free queue 202 can be treated in a uniform manner by atomic operators 224 and 228. Each of objects 204, 206, and 208 can have one or more of a distinct class variable, a distinct instance variable, or a distinct method. For example, each of objects 204, 206, and 208 be an instance of a class having an overloaded new operator, which, when called, accesses atomic operator 224 or atomic operator 228 to request an object from lock-free queue 202, and calls the constructor when no objects are returned from atomic operator 224 or atomic operator 228. The class can have an overloaded delete operator that, when called, performs customized clean up, accesses atomic operator 224 or atomic operator 228 to put an object in lock-free queue 202, and calls a destructor if, for example, lock-free queue 202 reaches capacity and cannot take the object.

Lock-Free Queue

Figure 3:
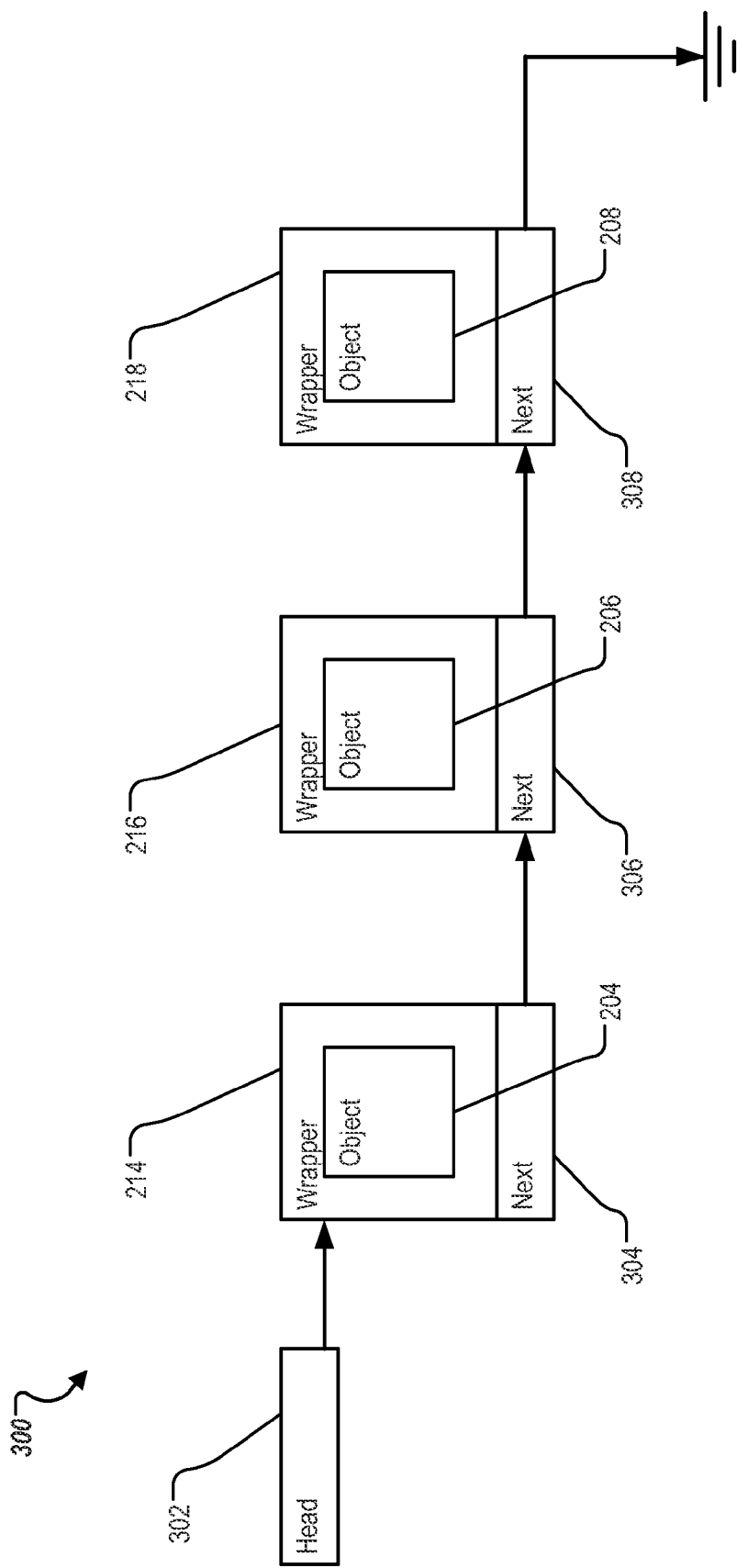
FIG. 3 is block diagram illustrating a first exemplary implementation of a lock-free queue for lock-free object recycling.

FIG. 3 is block diagram illustrating a first exemplary implementation of lock-free queue 202 for lock-free object recycling. Lock-free queue 300 can be a first implementation of lock-free queue 202 as described above in reference to FIG. 2. Lock-free queue 300 can be implemented on an operating system that provides a queue structure whose entries are identified by respective offsets. The queue provided by the operating system can be a last-in-first-out (LIFO) queue data structure. A LIFO queue can behave like a stack.

Lock-free queue 300 can be a LIFO queue. Lock-free queue 300 can include queue head identifier 302. Queue head identifier 302 can be a data structure provided in a system library. Queue head identifier 302 can be created when lock-free queue 300 is created.

Lock-free queue 300 can include one or more queue items. The queue items can include, for example, object 204, 206, and 208, each wrapped in a respective object wrapper 214, 216, or 218. Each queue item can be associated with a next-item indicator. A next-item indicator, e.g., next-item indicator 304 or 306, can include an identifier of a next queue item. The identifier can be an offset of the next queue item in lock-free queue 300. The last next-item indicator in lock-free queue 300, e.g., next-item indicator 308, can be null.

Figure 4:
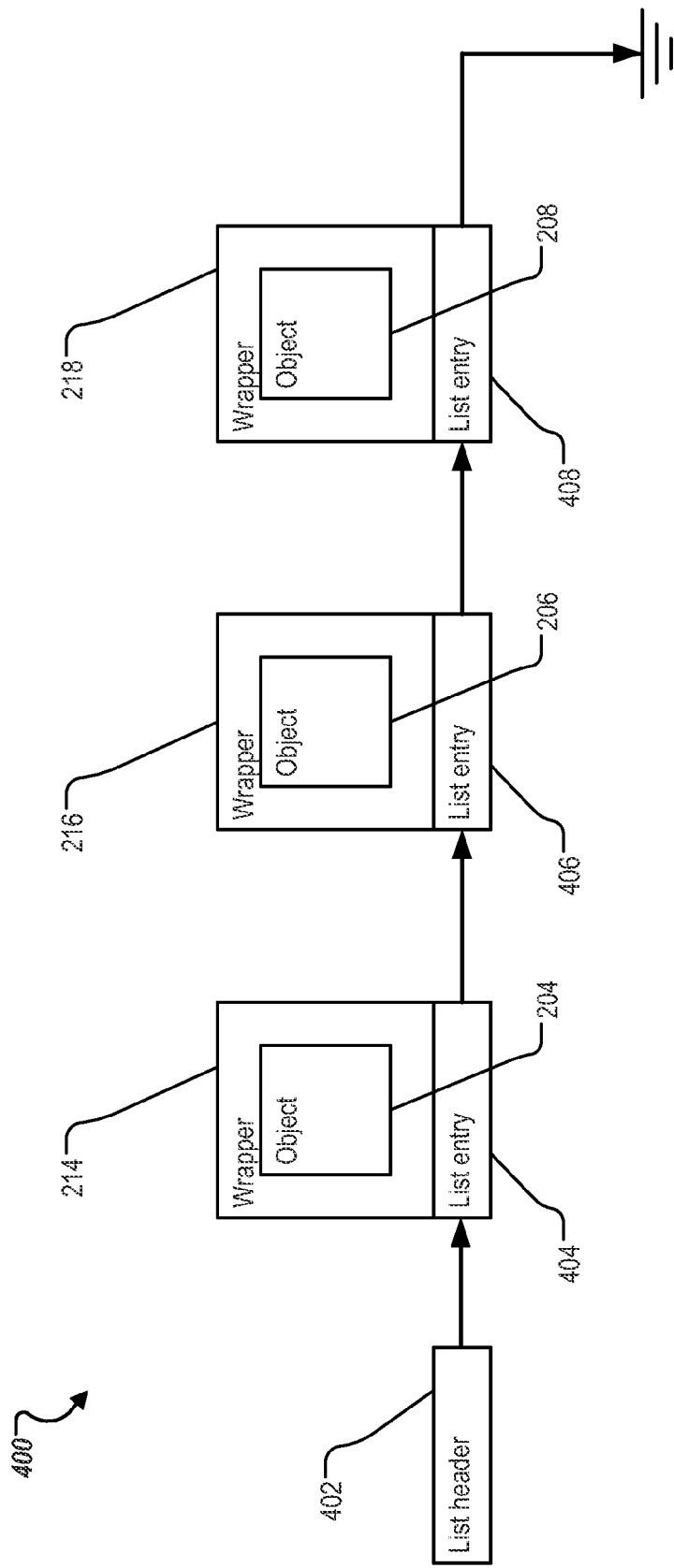
FIG. 4 is block diagram illustrating a second exemplary implementation of a lock-free queue for lock-free object recycling.

FIG. 4 is block diagram illustrating a second exemplary implementation of lock-free queue 202 for lock-free object recycling. Lock-free queue 400 can be the second implementation of lock-free queue 202 as described above in reference to FIG. 2. Lock-free queue 400 can be implemented on an operating system that provides a queue data structure implemented as a list.

Lock-free queue 400 can be a list. Lock-free queue 400 can include queue head identifier 402. Queue head identifier 402 can be a data structure provided in a system library identifying a head of a list. Queue head identifier 402 can be created when lock-free queue 400 is created.

Lock-free queue 400 can include one or more queue items. The queue items can include, for example, object 204, 206, and 208, each wrapped in a respective object wrapper 214, 216, or 218. Each queue item can be associated with a next-item indicator. Each next-item indicator, e.g., next-item indicator 404, 406, or 408, can include an operating system-specific data structure, e.g., a pointer, for linkage.

When creating lock-free queue 400, the system can use aligned memory allocation to assure that an operation, e.g., adding a queue item to or removing a queue item from lock-free queue 400, is atomic, as guaranteed by hardware or the operating system. Lock-free queue 400 can differ from lock-free queue 300 of FIG. 3 in next-item indicators, which can be platform-dependent. The difference can be compartmentalized. Accordingly, a lock-free queue data structure can be scaled to multiple platforms by changing a compartment, e.g., one that includes a next-item indicator, rather than changing the entire architecture.

Classes in Lock-Free Object Recycling

Figure 5:
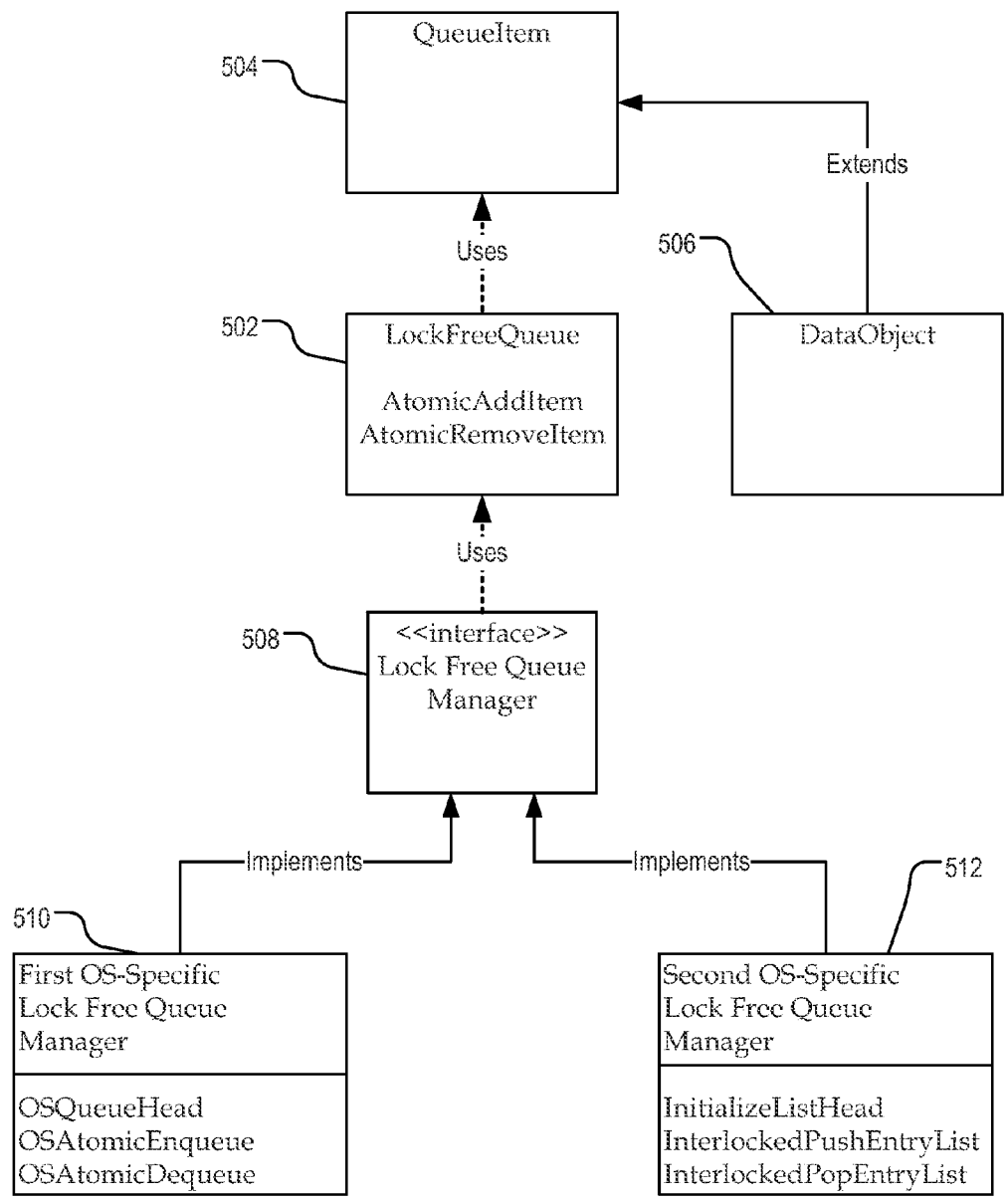
FIG. 5 is a class diagram illustrating an exemplary class structure of lock-free object recycling.

FIG. 5 is a class diagram illustrating an exemplary class structure of lock-free object recycling. Queue class 502 can be a lock-free queue class that includes functions of lock-free queue 202 of FIG. 2. Queue class 502 can use queue item class 504, which can be a class that includes functions of an object wrapper, e.g., object wrapper 214, 216, or 218 of FIG. 2. Data object class 506 can be a class that includes functions and data of object 204, 206, and 208 of FIG. 2.

Class 502 can include methods atomic add item and atomic remove an item. The atomic add item method can be configured to take a pointer or reference to a queue item object as a parameter, and add the queue item object to a lock-free queue in atomic time. The procedure for removing an item can be configured to retrieve a queue item from a lock-free queue atomically. The queue item retrieved can be any queue item in a lock-free queue, e.g., one located at a head of queue.

Queue item class 504 can include one or more data structures or operators that interface with, or include, a next-item indicator. Queue item class 504 can be an object wrapper, as described above, that encapsulate details of handling a next-item indicator. Data object class 506, when extending the queue item class 504, can allow a user object to behave in a manner that an operating system or hardware requires an item to behave for providing atomic operations. For example, queue item class 504 can include an overloaded operator, e.g., a new operator. When a process or thread requests a new object of data object class 506, the overloaded operator can call an operating system function to request an object from a lock-free queue.

Queue manager interface 508 can provide a level of abstraction for managing a lock-free queue. Multiple operating system-specific queue manager classes can implement queue manager interface 508. For example, first operating system-specific queue manager class 510 can include atomic operations specific to a first operating system. These operations can include, for example, OSQueueHead for getting a head of a queue, OSAtomicEnqueue for adding an item to a queue, and OSAtomicDequeue for removing an item from a queue. Second operating system-specific queue manager class 512 can include atomic operations specific to a second operating system. These operations can include, for example, InitializeListHead for initializing a head of a lock-free queue, InterlockedPushEntryList for pushing an item into a lock-free queue, and InterlockedPopEntryList for popping from a lock-free queue.

Exemplary Lock-Free Object Recycling Processes

Figure 6:
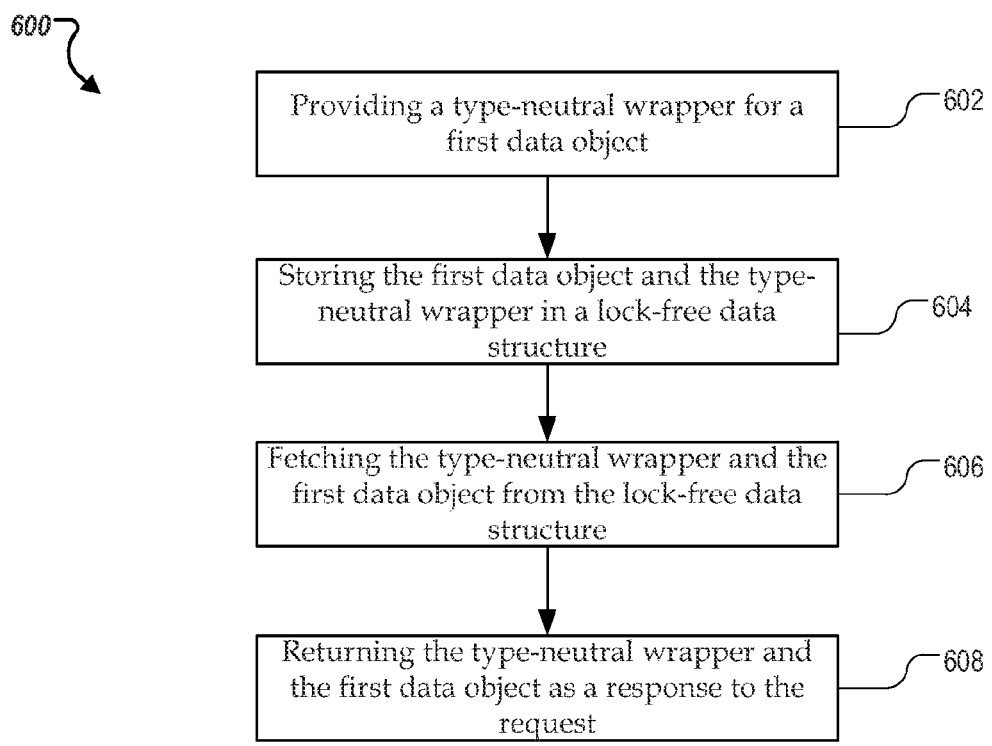
FIG. 6 is a flowchart illustrating an exemplary process of lock-free object recycling.

FIG. 6 is a flowchart illustrating exemplary process 600 of lock-free object recycling. A system implementing lock-free object recycling can provide (602) a type-neutral wrapper for a first data object. The type-neutral wrapper can include an operating system-specific data structure or hardware-specific data structure for linkage. The operating system specific data structure can include, for example, a next item indicator and an overloaded operator. The overloaded operator can be published as an application programming interface. The overloaded operator can include an overloaded new operator operable to provide memory allocation management functions and an overloaded delete operator operable to provide memory clean up functions.

Upon receiving an indicator that the first data object is no longer used, the system can store (604) the first data object and the type-neutral wrapper in a lock-free data structure. The lock-free data structure can include a LIFO queue. The system can perform operations of storing the first data object and the type-neutral wrapper using an object pool manager, e.g., a lock-free queue manager, associated with the lock-free data structure. The object pool manager can be configured to use operating system specific atomic queue manipulating operations to store or fetch items in the lock-free data structure. The atomic queue manipulating operations can include hardware-supported compare and exchange operations. Additionally or alternatively, the atomic queue manipulating operations can include operating-system specific atomic enqueue and dequeue operations.

In some implementations, upon receiving the indicator, the system can reset a component of the first data object before storing the first data object. Resetting the component can include setting a locale of the first data object to a pre-specified locale. The locale can include a set of parameters that specify a language, a country and one or more preferences for displaying the object in a user interface. For example, the locale can include a language identifier and a region identifier. Resetting the locale can allow a data object to be reused by a process that uses a different locale than a locale of a process that originally created the data object.

Upon receiving a request to create a second data object, the system can fetch (606) the type-neutral wrapper and the first data object from the lock-free data structure without using a lock. The system can perform operations of fetching the first data object and the type-neutral wrapper using the object pool manager.

The system can return (608) the type-neutral wrapper and the first data object as a response to the request. The first data object can have a first data type. The second object can have a second data type that is different from the first data type. The system can preserve common parts of the first data object and second data object, and initialize portions of the second data object that are not present in the first data object. Initializing only portions of the second data object can be more efficient than initializing every member of the second data object. The type-neutral wrapper can be a base class of the first data object and the second data object.

Exemplary System Architecture

Figure 7:
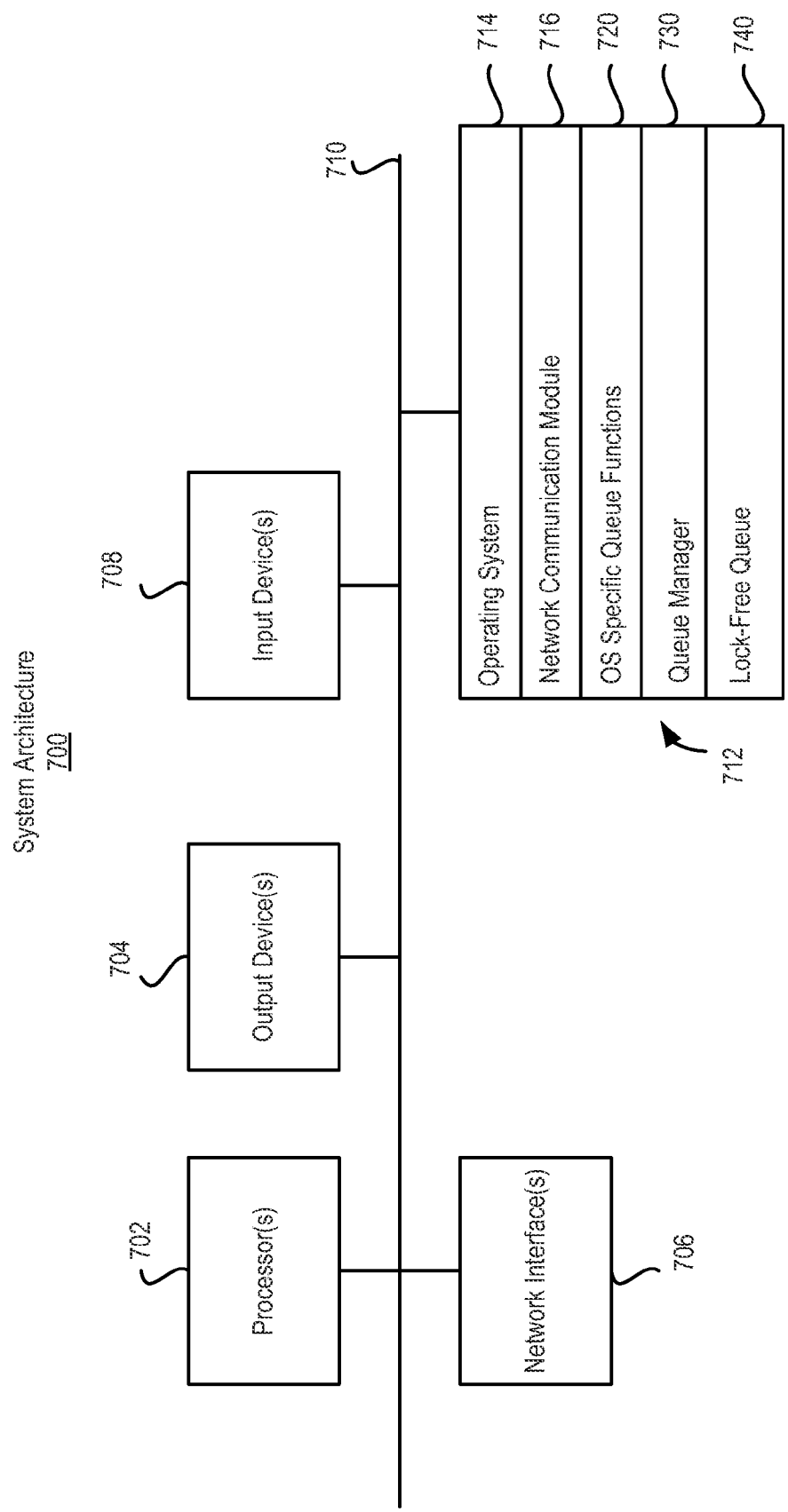
FIG. 7 is a block diagram of an exemplary system architecture for implementing the features and operations of FIGS. 1-6.

FIG. 7 is a block diagram of an exemplary system architecture 700 for implementing the features and operations of FIGS. 1-6. Other architectures are possible, including architectures with more or fewer components. In some implementations, architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to a medium that participates in providing instructions to processor 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 712 can further include operating system 714, network communication module 716, operating system specific queue functions 720, queue manager 730, and lock-free queue 740. Operating system 714 can be multi-user, multiprocessing, multitasking, multithreading, real time, etc. Operating system 714 performs basic tasks, including but not limited to: recognizing input from and providing output to devices 706, 708; keeping track and managing files and directories on computer-readable mediums 712 (e.g., memory or a storage device); controlling peripheral devices; and managing traffic on the one or more communication channels 710. An example operating system is a Linux® operating system, a Windows® operating system, or a Mac OS® operating system. Network communications module 716 includes various components for establishing and maintaining network connections (e.g., software for implementing communication protocols, such as TCP/IP, HTTP, etc.).

Operating system specific queue functions 720 can include computer instructions that, when executed, cause processor 702 to, initialize, add, or remove an item from a lock-free queue. Queue manager 730 can include computer instructions that, when executed, cause processor 702 to perform atomic queue manipulation operations. Lock-free queue 740 can include one or more inter-connected data structures, each data structure being a wrapper around an object.

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C++, Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
providing a type-neutral wrapper for a first data object;
upon receiving an indicator that the first data object is no longer used by a first procedure, storing the first data object and the type-neutral wrapper in a data structure, that is configured to avoid conflicting accesses to the first data object by using atomic operations in place of locks that block a second procedure from accessing the first data object while the first procedure accesses the first data object; and
upon receiving a request to create a second data object:
fetching the type-neutral wrapper and the first data object from the data structure by a data manager that performs the fetching using operating system specific atomic data manipulation; and
returning the type-neutral wrapper and the first data object as a response to the request.

2. The method of claim 1, wherein the type-neutral wrapper includes an operating system specific data structure for linkage.

3. The method of claim 2, wherein the operating system specific data structure includes an overloaded new operator operable to provide memory allocation management functions.

4. The method of claim 1, wherein the data manager is an object pool manager is associated with the data structure.

5. The method of claim 1, wherein the data structure includes a last in first out (LIFO) queue.

6. The method of claim 1, comprising:
upon receiving the indicator, resetting a component of the first data object before storing the first data object.

7. The method of claim 6, wherein resetting the component comprises setting a locale of the first data object to a system locale.

8. The method of claim 1, wherein:
the first data object has a first data type,
the second data object has a second data type that is different from the first data type, and
the type-neutral wrapper is a base class of the first data object and the second data object.

9. The method of claim 1, wherein:
the data structure is a lock free data structure, and
the operating system specific atomic data manipulation is used in place of a lock.

10. A non-transitory storage device storing instruction operable to cause one or more processors to perform operations comprising:
providing a type-neutral wrapper for a first data object;
upon receiving an indicator that the first data object is no longer used by a first procedure, storing the first data object and the type-neutral wrapper in a data structure that is configured to avoid conflicting accesses to the first data object by using atomic operations in place of locks that block a second procedure from accessing the first data object while the first procedure accesses the first data object; and
upon receiving a request to create a second data object:
fetching the type-neutral wrapper and the first data object from the data structure by a data manager that performs the fetching using operating system specific atomic data manipulation; and
returning the type-neutral wrapper and the first data object as a response to the request.

11. The non-transitory storage device of claim 10, wherein the type-neutral wrapper includes an operating system specific data structure for linkage.

12. The non-transitory storage device of claim 11, wherein the operating system specific data structure includes an overloaded new operator operable to provide memory allocation management functions.

13. The non-transitory storage device of claim 10, wherein the data manager is an object pool manager is associated with the data structure.

14. The non-transitory storage device of claim 10, wherein the data structure includes a last in first out (LIFO) queue.

15. The non-transitory storage device of claim 10, the operations comprising:
upon receiving the indicator, resetting a component of the first data object before storing the first data object.

16. The non-transitory storage device of claim 15, wherein resetting the component comprises setting a locale of the first data object to a system locale.

17. The non-transitory storage device of claim 10, wherein:
the first data object has a first data type,
the second data object has a second data type that is different from the first data type, and
the type-neutral wrapper is a base class of the first data object and the second data object.

18. The non-transitory storage device of claim 10, wherein:
the data structure is a lock free data structure, and
the operating system specific atomic data manipulation is used in place of a lock.

19. A system comprising:
one or more processors; and
a non-transitory storage device storing instruction operable to cause the one or more processors to perform operations comprising:
providing a type-neutral wrapper for a first data object;
providing a type-neutral wrapper for a first data object;
upon receiving an indicator that the first data object is no longer used by a first procedure, storing the first data object and the type-neutral wrapper in a data structure that is configured to avoid conflicting accesses to the first data object by using atomic operations in place of locks that block a second procedure from accessing the first data object while the first procedure accesses the first data object; and
upon receiving a request to create a second data object:
fetching the type-neutral wrapper and the first data object from the data structure by a data manager that performs the fetching using operating system specific atomic data manipulation; and
returning the type-neutral wrapper and the first data object as a response to the request.

20. The system of claim 19, wherein the type-neutral wrapper includes an operating system specific data structure for linkage.

21. The system of claim 20, wherein the operating system specific data structure includes an overloaded new operator operable to provide memory allocation management functions.

22. The system of claim 19, wherein the data manager is an object pool manager is associated with the data structure.

23. The system of claim 19, wherein the data structure includes a last in first out (LIFO) queue.

24. The system of claim 19, the operations comprising:
upon receiving the indicator, resetting a component of the first data object before storing the first data object.

25. The system of claim 24, wherein resetting the component comprises setting a locale of the first data object to a system locale.

26. The system of claim 19, wherein:
the first data object has a first data type,
the second data object has a second data type that is different from the first data type, and
the type-neutral wrapper is a base class of the first data object and the second data object.

27. The system of claim 19, wherein:
the data structure is a lock free data structure, and
the operating system specific atomic data manipulation is used in place of a lock.

* * * * *